US005580207A

United States Patent [19]

Kiebooms et al.

[11] Patent Number: 5,580,207

[45] Date of Patent: Dec. 3, 1996

[54] DEVICE FOR MOVING BEDS

[75] Inventors: Lucas Kiebooms; Joseph Froyen; Paul Plevoets, all of Genk, Belgium

[73] Assignee: Elaut, Naamloze Vennootschap, Belgium

[21] Appl. No.: 361,192

[22] Filed: Dec. 21, 1994

[30] Foreign Application Priority Data

Dec. 21, 1993 [BE] Belgium ................................ 9301429

[51] Int. Cl.[6] ................................................ B60P 1/02

[52] U.S. Cl. .......................... 414/495; 414/608; 254/126; 254/7 B; 187/267; 187/269; 180/252; 180/19.2; 5/510

[58] Field of Search ................................ 5/510; 414/495, 414/498, 589; 187/233, 269, 267; 180/19.2, 19.3, 252, 19.1; 254/98, 8 R, 9 R, 7 R, 7 B, 7 C, 85, 126, 131, DIG. 8

[56] References Cited

U.S. PATENT DOCUMENTS

| | | | |
|---|---|---|---|
| 1,432,299 | 10/1922 | Pleines | 187/267 X |
| 3,392,858 | 7/1968 | Fernstrom et al. | 414/495 |
| 4,405,116 | 9/1983 | Eisenberg | 187/269 X |
| 5,012,879 | 5/1991 | Bienek et al. | 414/495 X |
| 5,262,706 | 11/1993 | Hollingsworth | 254/126 X |

FOREIGN PATENT DOCUMENTS

| | | | |
|---|---|---|---|
| 242059 | 12/1964 | Austria | 414/608 |
| 862188 | 2/1941 | France | 254/8 B |
| 89766 | 5/1896 | Germany . | |
| 1182079 | 11/1964 | Germany | 414/608 |
| 3536492 | 4/1987 | Germany . | |
| 8815279 | 3/1989 | Germany . | |
| 107283 | 6/1917 | United Kingdom . | |
| 792646 | 2/1958 | United Kingdom . | |
| 1310164 | 3/1973 | United Kingdom . | |
| 1465007 | 2/1977 | United Kingdom . | |
| WO87/07830 | 12/1987 | WIPO . | |
| WO94/16935 | 4/1995 | WIPO . | |

*Primary Examiner*—Frank E. Werner

*Attorney, Agent, or Firm*—Bacon & Thomas

[57] ABSTRACT

A device for moving beds includes a moveable frame (2); a lifting mechanism (4) which can cooperate with the underframe of a bed (49); and a steering mechanism (5).

4 Claims, 3 Drawing Sheets

DEVICE FOR MOVING BEDS

BACKGROUND OF THE INVENTION

The present invention concerns a device for moving beds, in particular beds on wheels, as are used for example in hospitals, homes for the elderly and such like.

The problems occurring during the removal of a bed whose frame rests on four wheels which can each turn 360 degrees around a vertical axis are known. Such beds are indeed difficult to steer, which has for a result that the planned course is often departed from resulting in walls, doors and such being hit and damaged. Usually, two persons are required to move the bed, given the physical power needed.

SUMMARY OF THE INVENTION

The present invention contemplates a device for moving beds, in particular the above-mentioned beds, which totally excludes said and other disadvantages. In other words, said bed can be moved such that it follows only the desired course, so that damages to walls, doors and such can be entirely avoided. Moreover, the steering requires practically no physical effort.

To this end, the invention consists of a device for moving beds which is mainly formed of a moveable frame; a lifting mechanism which can be connected to the underframe of a bed; and a steering mechanism.

This device is indeed perfectly steerable when the bed is pushed ahead or drawn at.

If required, the device can also be guided along a fixed trajectory from which it cannot divert unless the person steering it wants it to do so, either because the wheels are guided in grooves or such provided in the ground, either because means are provided in or on the floor which can for example be scanned magnetically, by means of infrared, laser, CCD or such.

BRIEF DESCRIPTION OF THE DRAWINGS

In order to better explain the characteristics of the invention, the following preferred embodiment of a device for moving beds is described as an example only without being limitative in any way, with reference to the accompanying drawings, in which.

DETAILED DESCRIPTION

Figure 1:
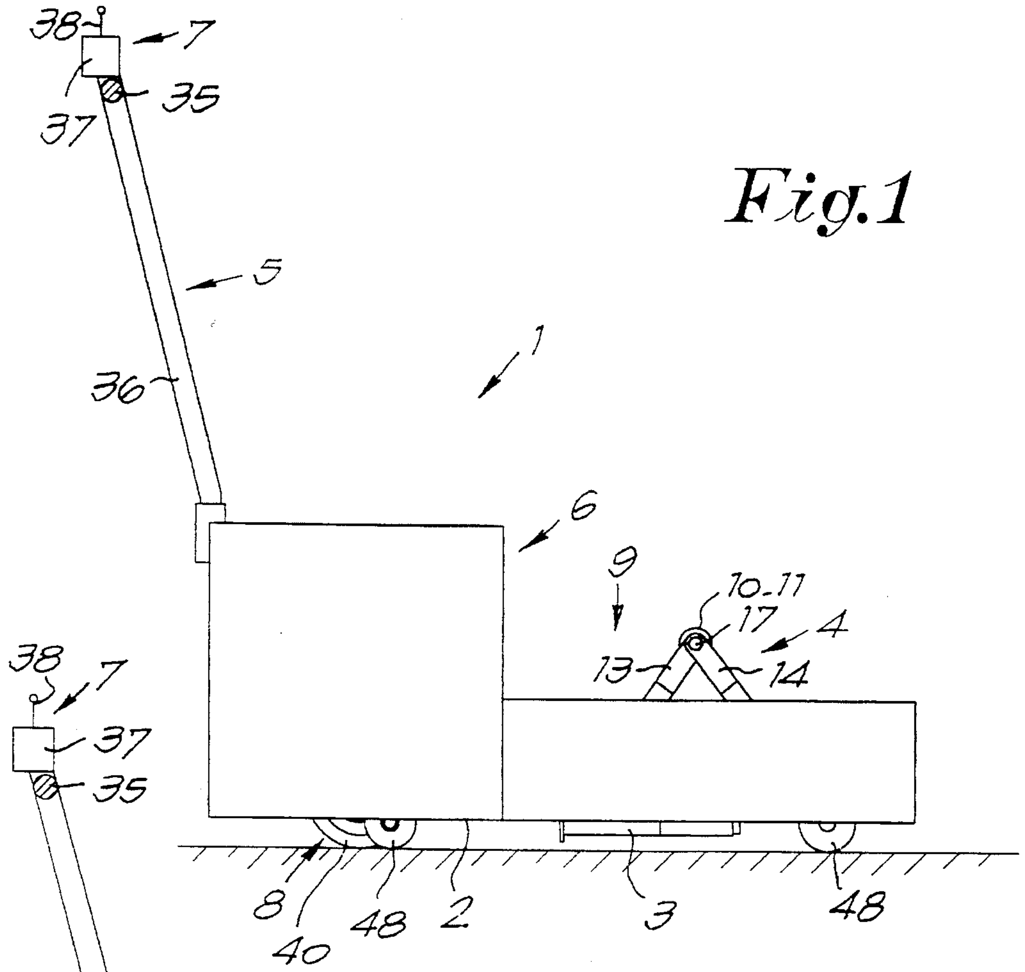
FIG. 1 shows a side view of a device according to the invention.

As shown in the figures, a lifting and steering device 1 for moving beds or such according to the invention mainly consists of a mobile frame 2; on the frame 2 a lifting mechanism 4 preferably driven by a lift drive motor 3 which can cooperate with an object to be lifted, in particular the underframe of a bed; and a steering mechanism 5 with which the device 1 can be moved and directed in the required direction.

The frame 2 consists of a first part 6 which contains the steering mechanism 5 which consists of a steering unit 7 and a traction drive 8 and of a second part 9 which is made lower and narrower than the first part 6 and which contains the lifting mechanism 4.

The lifting mechanism 4, which is mounted in the front part of the frame 2, mainly consists of at least one pressing element which can be moved in a vertical plane made up of rollers 10–11 and which is controlled by means of a lifting drive means 12.

The drive means 12 mainly consist of two pair of hinged arms 13–14 which are mounted freely rotatable at one end on a common shaft 15 upon which also the rollers 10–11 are mounted freely rotatable, with an intermediate bush 16 being provided to keep the pairs of arms 13–14 at a apart and wherein the rollers 10–11 are maintained in place by means of nuts 17; and a lifting drive motor 3 which drives the above-mentioned arms via a transmission 18.

Preferably, each pair of arms 13–14 has a bent profile, one and other such that both ends of each arm run parallel to one another, but are offset sideways in relation to one another.

According to another embodiment, which is not represented in the drawings, the lifting mechanism 4 may be equipped with a pressing element which may be possibly made wider.

The above-mentioned transmission 18 consists of a number of meshing gear wheels 19–20–21 and/or geared belts which transmit the torque of the motor 3 to a horizontal rod 22 which consists of two parts, 23 and 24 respectively, which each have outside thread.

One part, for example 23 of the rod 22 has a right-handed screw thread whereas, and the second part 24 has a left-handed screw thread, preferably with the same pitch.

On each part 23–24 of the rod 22, there is provided a threaded nut, 25 and 26 respectively, in this case in the shape of a cross beam, with which, via pivots 27–28 and 29–30, the ends of the pairs of arms 13, 14 are pivotally connected.

Bore holes are further provided in the nuts 25–26 with which guides 31–32 cooperate, said guides being fixed with end pieces 33–34 which are in turn appropriately connected to the frame 2.

It is clear that the lifting mechanism 4 is not limited to the embodiment described above and represented in the accompanying drawings with an electric drive, but that also other drives are possible, such as a manual drive, which makes use for example of a crank with which the horizontal rod 22 can be driven directly or via a transmission.

The steering unit 7, situated at the height of the first part 6 of the frame 2, mainly consists of a rod transverse 35 which can function as a handle and an almost vertically directed, fixed steering shaft 36 which connects the transverse 35 to the frame 2 of the device 1.

On the transverse rod 35 is provided a removable control panel 37 with a steering controller handle 38 which can be either moved or not.

Figure 2:
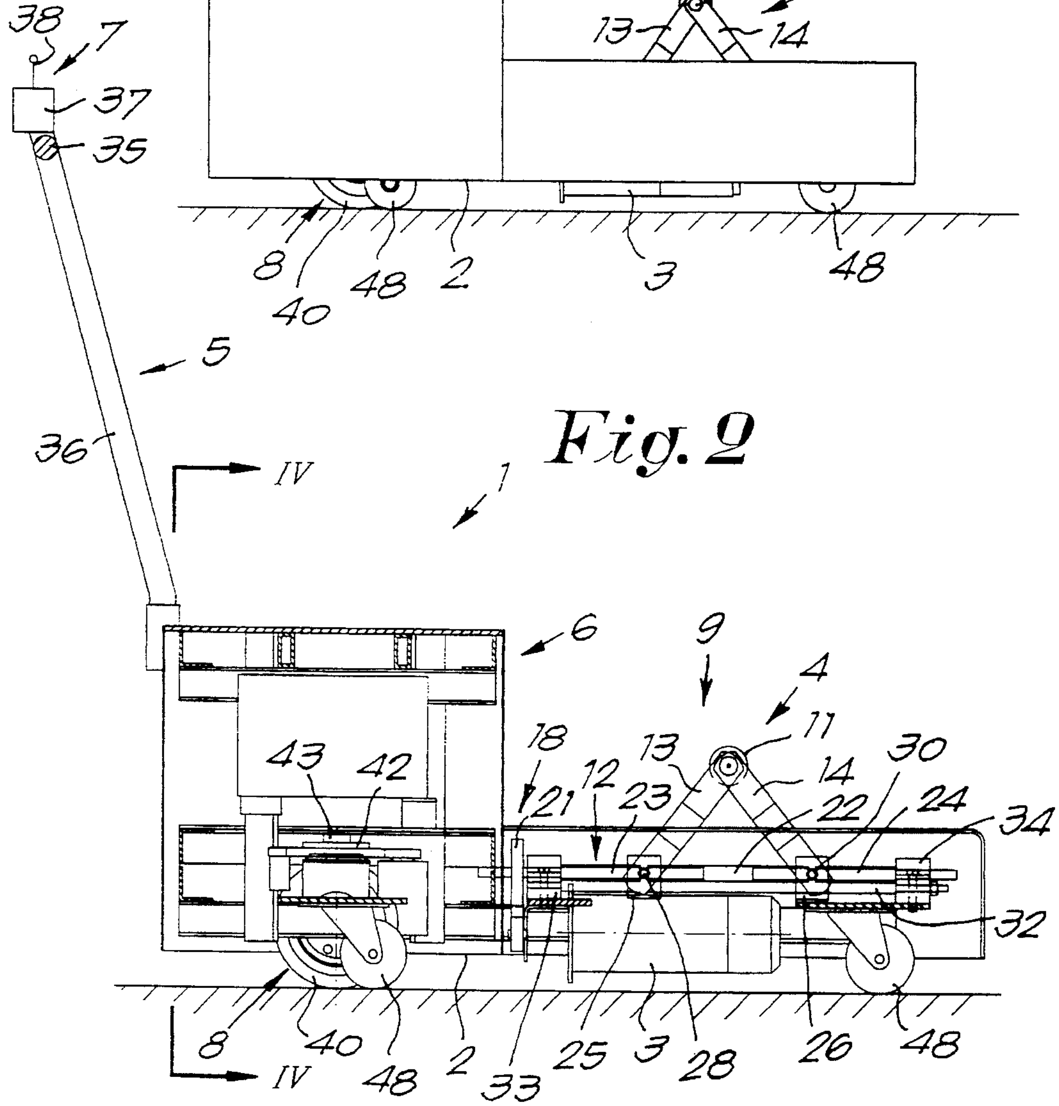
FIG. 2 shows a longitudinal section to a larger scale of the device according to the invention.
Figure 3:
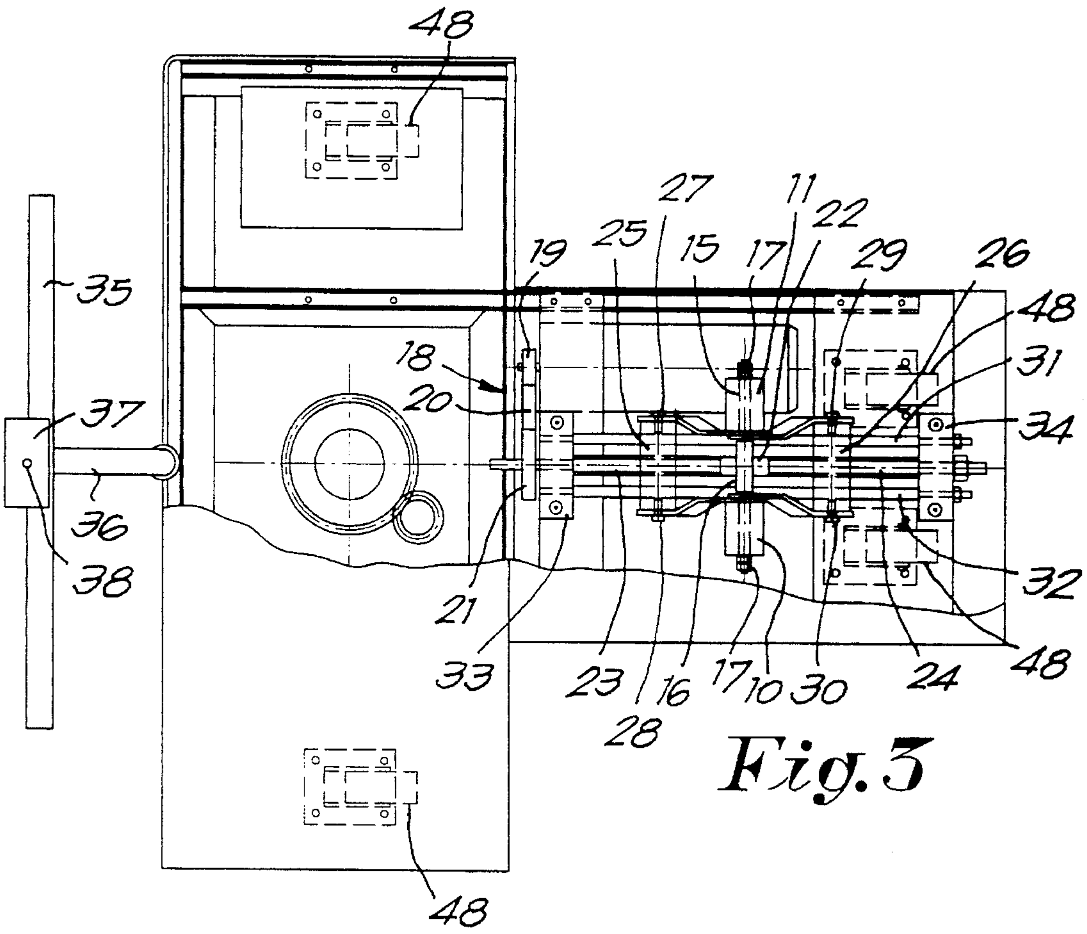
FIG. 3 shows a top view with a partial cut-out of the device according to FIG. 2.
Figure 4:
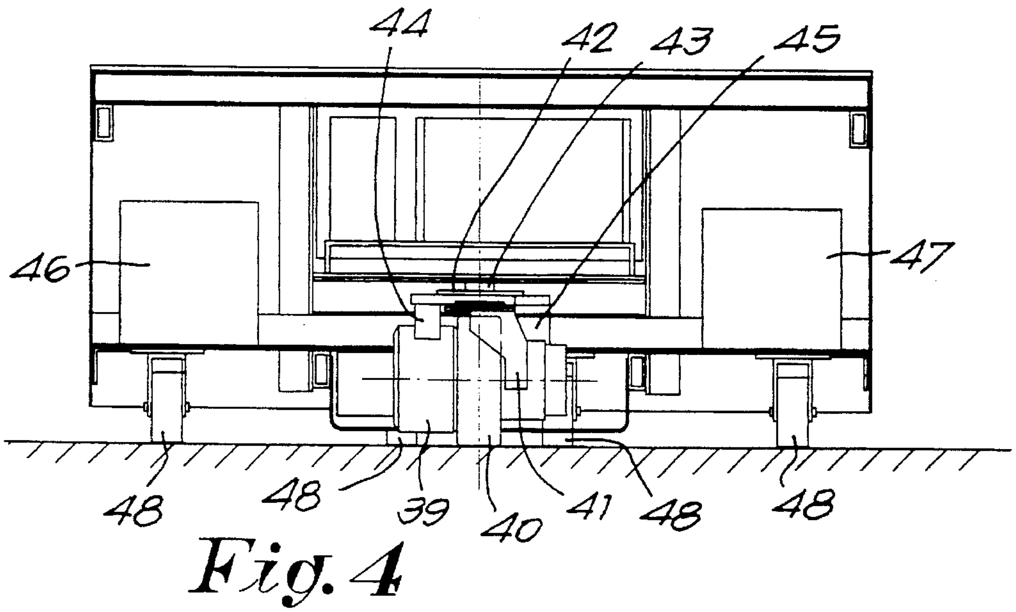
FIG. 4 shows a section according to line IV—IV in FIG. 2.

The traction drive 8 of the device 1, as represented in the FIGS. 2, 3 and 4, mainly consist of an electric driving motor 39 which can drive a support surface engaging drive roller 40.

This drive roller 40 is preferably made of a material with a large coefficient of friction and is mounted by bearing in a foot 41 which is in turn connected to a steering gear 42 which is fixed on a vertical shaft 43 which itself is bearing-mounted in a freely rotatable manner in the frame 2.

The housing of the driving motor 39 is fixed to the steering gear 42 for example by means of a connecting piece 44.

The rotation of the steering gear 42 takes place as represented in the FIGS. 2 and 3 under the influence of a steering motor 45 whose outgoing shaft is equipped with a gear wheel which meshes with the steering gear 42 and which can receive a signal from the steering unit 7 in order to obtain, depending of the position of the steering handle 38 on the control panel 37, that the steering gear 42 is driven in one sense of rotation or the other.

The power required for the drive of the above-mentioned motors is supplied by preferably two chargeable batteries 46–47 which are situated in the above-mentioned first part.

It is clear that the invention can be driven both electrically and manually, for example by setting up the steering shaft 36 with the accompanying transverse 35 in a rotatable manner, whereby the position of the bearing roller 40 is influenced either directly or via a transmission.

According to another embodiment which is not represented in the drawings, also the driving motor 39 can be replaced by human pushing force, whereby the user will push the device according to the invention ahead or draw at it by means of the steering shaft 36.

Further, the frame 2 is also equipped with four support wheels 48.

Figure 5:
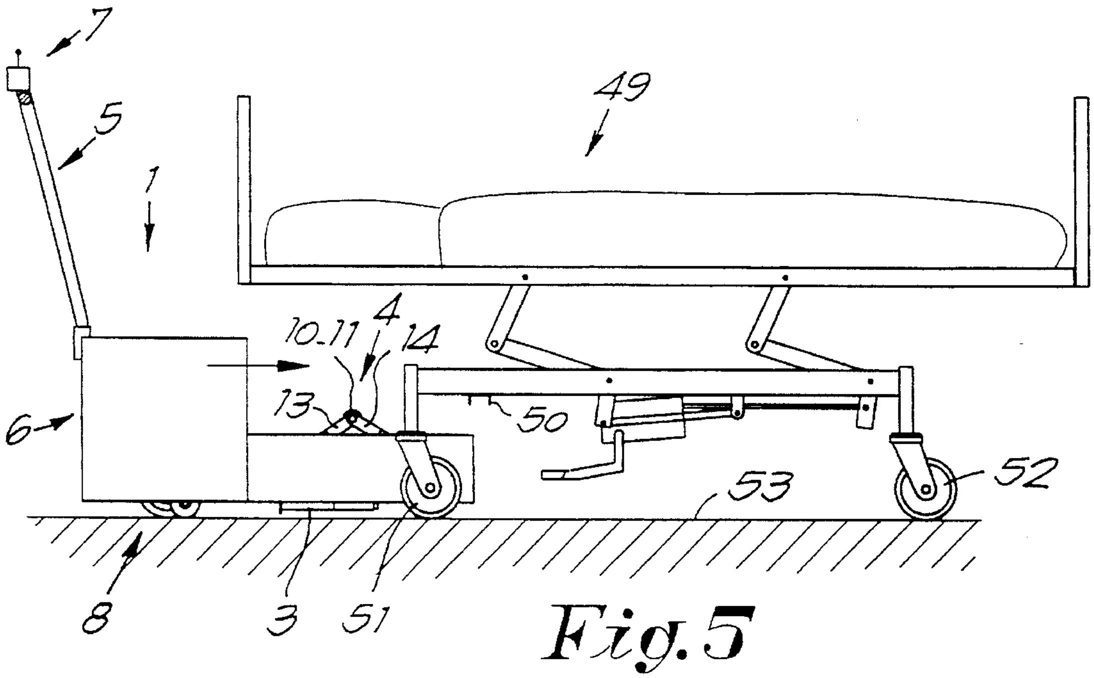
FIGS. 5 and 6 depict the use of a device according to the invention.
Figure 6:
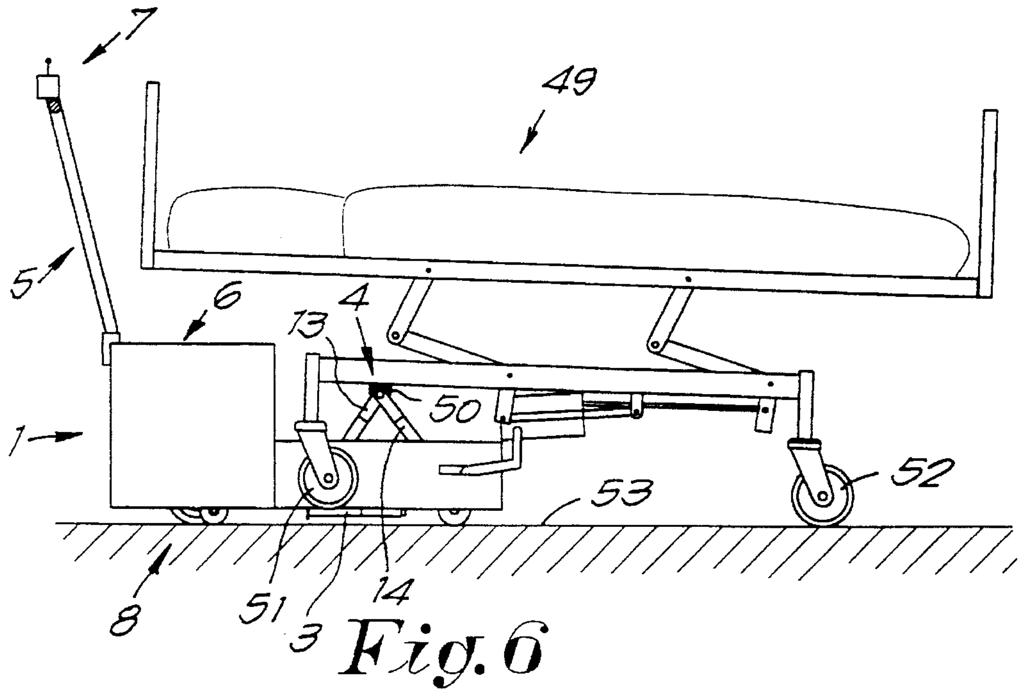

As represented in the FIGS. 5 and 6, a bed 49 which is meant to work in conjunction with a device according to the invention, will be preferably equipped at the bottom side with a reversed, U-shaped element 50, provided diagonally, with which the device according to the invention can cooperate.

It is clear that also other couplings between the device according to the invention and a bed are possible and that the device is thus not restricted to the pressure rollers represented in the figures which can cooperate with a reversed, U-shaped profile, but that any form of cooperation whatsoever between the lifting mechanism 4 and a bed underframe is possible.

Also, it is self-evident that the device according to the invention, instead of being made separately, can also be fully integrated with a bed.

In this case, every bed will be equipped at the bottom with its own device according to the invention, such that this bed can be moved immediately at any time, whereby also in the latter case the bed can be steered manually, semi-automatically or fully automatically.

The use and operation of the device according to the invention is very simple and as follows.

As represented in FIG. 5, a device 1 for moving a bed with the lifting mechanism 4 can be brought between the two front support wheels 51 of a bed 49 in downward position, which is possible because the second part 9 of the frame 2 is made lower and narrower than the first part 6.

Hereby, the device according to the invention with the above-mentioned rollers 10–11 is brought to right under the above-mentioned reversed, U-shaped element 50.

Subsequently, by exciting the motor 3, the rod 22 will be rotated via the gear wheels 19–20–21 and/or geared belts, as a result of which the nuts 25–26 shift over the horizontal guides 31–32 and move towards each other.

Consequently, the two rollers 10–11 will be pushed upward in the reversed, U-shaped element 50 by the arms 13–14, as a result of which the bed 49, as represented in FIG. 6, is lifted with its two front support wheels 51 from the floor 53.

The element 50 hereby makes sure that a further relative movement between the lifting mechanism 4 and the bed 49 is hindered.

Because the bed 49 only rests on the floor with the rear support wheels 52 which have not been lifted yet, the entire bed 49 can be moved thanks to the movement of the device 1 according to the invention, whereby the support wheels 52 become follow-on wheels, one and other such that the bed perfectly follows the path which is taken by the device according to the invention. The steering of the whole of the device and the bed hereby takes place by moving the steering controller handle 38 on the control panel 37.

Because the accompanying person usually walks behind the device according to the invention with the bed, the control panel 37 is preferably placed in a detachable manner on the rod transverse 35, whereby a connection remains, however, between the device and the control panel 37 by means of a cable or, in another variant, by means of radio waves, infrared or such like.

It is clear that, as a result, the accompanying person can walk behind the device with the bed and still can guide the whole in the right path by means of the control panel 37.

According to a variant, grooves and/or markings which can be identified magnetically, by means of infrared, laser, CCD or such can be provided on or in the floor, in particular in the bends of corridors and such like, as a result of which the wheels, when entering the bend, are guided in such grooves and/or markings.

According to another variant, the device according to the invention could be equipped such that it is steered entirely autonomously via markings or guiding systems, which are provided on or in the floor, in order to lift and move a bed. The device can hereby be controlled for example from a central steering unit.

In the above variant, an accompanying person only has to follow the device with the bed and thus does not need to steer or push anymore, whereby the accompanying person only needs to intervene should a problem arise.

Finally, with an even more advanced steering, even the presence of an accompanying person would be no longer required as the device with the bed and patient could be followed on monitors or screens.

It is clear that a device according to the invention makes it possible for a bed to be moved through narrow passages such as doors, corridors and such without damaging the wall or other objects. The present invention is by no means limited to the above-described embodiment represented in the accompanying drawings; on the contrary, a device for moving beds according to the invention can be made in all shapes and dimensions while still remaining within the scope of the invention.

We claim:

1. A lifting and steering device for raising and moving beds comprising:

a frame having an underside and an upper side;

wheels connected to the underside of the frames, said wheels including a singular traction and steering wheel;

a bed raising mechanism mounted on the frame and extendable from the upper side of the frame, said mechanism including an elevating device movable from a lower retracted position to a higher bed engaging and raising position;

a first electric motor drivingly connected to the elevating device for driving the elevating device between said lower and higher positions;

a second electric motor drivingly connected to the traction and steering wheel for driving the traction and steering wheel in rotation for propelling the lifting and steering wheel relative to a support surface engaging the traction and steering wheel;

a steering member rotatably connected to the frame for rotation about a vertical steering axis;

a third electric motor drivingly connected to the steering member for effecting rotation of the steering member about said vertical steering axis in opposite directions;

said traction and steering wheel connected to said steering member for rotation therewith about said vertical steering axis relative to said frame;

a source of electrical energy carried by the frame;

a manipulable handle connected to the frame, said handle including a transverse member arranged so as to be graspable by an operator of the steering and lifting device;

a control panel mounted on said handle and electrically connected to at least said third electric drive motor and said source of electrical energy, and including means for controlling electrical actuation of said third motor in opposed directions to thereby provide steering control of the lifting and steering device.

2. The lifting and steering device according to claim 1, wherein said control panel is removably connected to said handle and is arranged to be grasped and manipulated by an operator of said steering and lifting device when removed from said handle, said control panel remaining electrically connected to said third motor and source of electrical energy when removed from said handle and when manipulated by an operator to effect remote control over steering of the lifting and steering device.

3. The lifting and steering device according to claim 1, wherein said steering member is a first gear member having a first diameter and said third motor is drivingly connected to said steering member through a cooperating directly connected second gear having a smaller diameter than the first gear member.

4. The lifting and steering device according to claim 1, wherein said source of electrical energy includes at least a first battery electrically connected to said first motor and a second battery electrically connected to said third motor; and wherein said means for controlling electrical actuation of said third motor is electrically connected to said second battery.

* * * * *